United States Patent

Frayer

[15] 3,705,383

[45] Dec. 5, 1972

[54] BIOLOGICAL SAMPLE PATTERN ANALYSIS METHOD AND APPARATUS

[72] Inventor: William W. Frayer, 445 East 69th Street, New York, N.Y. 10021

[22] Filed: Aug. 6, 1971

[21] Appl. No.: 169,863

Related U.S. Application Data

[63] Continuation of Ser. No. 775,233, Nov. 6, 1968, abandoned.

[52] U.S. Cl. ....................340/146.3 R
[51] Int. Cl. ....................G06k 9/00
[58] Field of Search....................340/146.3

[56] References Cited

UNITED STATES PATENTS

| | | | |
|---|---|---|---|
| 3,345,502 | 10/1967 | Berg et al. | 235/92 PS |
| 2,688,441 | 9/1954 | Merrill et al. | 235/92 PS |
| 3,439,212 | 4/1969 | Feinstein | 235/92 PS |
| 2,933,246 | 4/1960 | Rabinow | 340/146.3 |
| 3,104,372 | 9/1963 | Rabinow et al. | 340/146.3 |
| 3,184,712 | 5/1965 | Holt | 340/146.3 |
| 2,731,202 | 1/1956 | Pike | 235/92 |
| 3,315,229 | 4/1967 | Smithline | 340/146.3 |
| 3,392,331 | 7/1968 | Coulter | 235/92 UX |

*Primary Examiner*—Thomas A. Robinson
*Attorney*—Richard G. Stephens

[57] ABSTRACT

Method and apparatus for pattern recognition, and especially leukocyte identification, by optical scanning of a pattern to derive a waveform which is processed to provide one or more histograms defining the scanned pattern in terms of the frequency of occurrence of elemental areas having various optical transparencies or reflectances, without regard to the spatial arrangement of the various elemental areas. Apparatus for deriving and recording histogram functions in both digital and analog form is disclosed, together with various arrangements for recording, displaying, and analyzing histogram data values to classify patterns. Also disclosed is a pattern recognition system which utilizes histogram function data values together with spatially-dependent data sensed from the pattern to identify the pattern.

47 Claims, 9 Drawing Figures

INVENTOR.
WILLIAM W. FRAYER
BY
Richard G. Stephens

BIOLOGICAL SAMPLE PATTERN ANALYSIS METHOD AND APPARATUS

The present application is a continuation of application Ser. No. 775,233, filed Nov. 6, 1968 and now abandoned.

My invention relates to method and apparatus for automatic processing and analysis of patterns, and particularly to analysis and identification of blood cells, such as in connection with the differential counting of leukocytes. The method and apparatus are also useful for analysis and identification of various other patterns, and in particular, of patterns in which fine detail and/or different pattern shades are important, such as in the detection of counterfeit paper currency.

A large amount of information which is indispensable to a physician or other medical or biological worker is available only from analysis of blood samples, and a variety of present medical and biological procedures involve microscopic examination of blood samples, including, for example, determination of the number of red cells, and determination of the number of leukocytes, "white cells" in a given volume of blood. The two specifically mentioned procedures have been highly developed, and economical equipment is available with which relatively unskilled personnel are enabled to determine red cell count and leukocyte count accurately and rapidly. A considerable amount of important medical information is not available, however, from a mere counting of leukocytes but requires an identification of and recognition of various features of individual leukocytes, both in order to detect specific characteristics or abnormalities of an individual leukocyte, and to classify a given leukocyte into one of a number of standard classes, which include for example, lymphocytes, monocytes, eosinophiles, neutrophils and basophils. Accurate identification of a given leukocyte as a particular type, and recognition of various abnormalities or other characteristics of a leukocyte is ordinarily attempted by visual observation of the leukocyte by a technician or pathologist through a laboratory microscope, with the specimen cell illuminated from below, so that different portions of the cell having different optical densities become discernible. The accuracy of identification and indeed whether certain cell features are observed at all depends considerably upon the knowledge and experience of the observer. In practice much information available from microscopic examination of a leukocyte is overlooked by, or not even discernible to, even very highly-skilled pathologists. A human operator is capable of discriminating between only a relatively few different optical densities or "shades of gray" in the observed specimen. Furthermore, that capability may vary from time to time in a single individual, and may vary widely between different individuals. Utilizing available electro-optical scanning techniques, a large number (even as many as several hundred) or different and distinct optical densities may be readily distinguished, providing much greater information about the structure of the cell. Attempts have been made in the prior art to overcome subjective inaccuracy and unreliability by optical scanning of leukocytes and use of various pattern recognition techniques which determine, for example, sizes, curvatures and shapes and boundaries of cell features.

If the detail of a specimen cell is to be noted, an optical scanner must incorporate high resolution, so that the scanned field of view is broken down into a large number of elemental areas, and if certain subtle features of a cell are to be noted, the optical density of each elemental area must be classified as one of a number of density levels. For example, if a cell approximately 10 microns in diameter in a 12 by 12 micron background area is scanned with a system resolution of 0.2 micron, a single scanning would provide 3,600 successive optical density signal values, and if a plurality of n scan lines are provided through each elemental area to insure the detection of any image portion of 0.2 micron diameter, $3{,}600n^2$ significant optical density signal values are provided by each scanning frame. Typical optical scanning systems which have been used to analyze cells with acceptable detail have provided several hundred thousand optical density signals to represent a single cell. A further reason that very high resolution is required in the optical scanning system is that practical applications tend to require that an operator be able to view successive leukocytes on a television monitor so that leukocytes of interest in a blood sample may be selected and positioned, and high resolution is required in order that the monitor present a clear and detailed display.

To obtain maximum information from the scanning, each of the density signal values should be classified or digitized into one of perhaps 32 or more optical density classes. In at least one prior art system 255 different optical density levels were noted. If a set of several hundred thousand signals representing a number of optical densities are applied to a general purpose digital computer which is suitably programmed, a number of useful characteristics of the cell may be determined, but such an abundance of input data requires use of a large amount of computer time and/or the use of a large and expensive computer, and the use of a complex program, so that such an arrangement becomes wholly impractical and far too expensive for routine use. Also, a large number of special-purpose computer pattern-recognition systems which are suitable for processing small amounts of input data are completely impractical or prohibitively expensive for leukocyte analysis due to the large amount of data which detailed scanning of a cell produces. While decreasing the resolution of the scanning system would decrease the size of the set of data values which describe a cell, it offers no solution, since it would merely result in important fine details in the cell image being overlooked. The problem of cell image analysis may be seen to differ markedly from most pattern recognition problems, such as recognition of printed or written characters, in that fine detail tends to be very important, and perhaps as much or more important than overall shape and spatial arrangement, in cell image analysis, while the converse is generally true in character recognition systems. Thus it is a primary object of the present invention to provide method and apparatus for machine analysis of images or patterns, such as images of blood cells, for example, which enable an image to be scanned with great resolution to provide signals characteristic of the image with great detail, but to provide signals which are easily adapted to further processing, either manually or by machine, in a rapid and economical manner.

One central concept of the present invention involves processing a scanning-derived waveform which has a large number of successive values to provide a histogram function of the waveform, i.e. a function in which the frequency of occurrence of each of the successive values of the scanning-derived waveform is described against an arbitrary scale. In various embodiments of the invention the histogram function may be physically represented in a variety of different ways such as by a curve traced by a plotter, or by a set of analog voltages, or by conditions set into any of a number of analog function storage devices or hybrid analog-digital function storage devices, or by a set of digital values, which may be stored in or registered by any one of a large number of digital storage or register or recorder means. By producing a histogram function of a scanning-derived waveform, hundreds of thousands of data values which represent an image may be reduced to a relatively few data values which are readily amenable to further processing, either manually or using analog waveform analysis, or using digital numerical analysis. Thus it is another important object of the invention to provide improved method and apparatus for producing histogram functions of scanning-derived waveforms.

As will be seen below, a histogram produced by scanning an image of a leukocyte contains sufficient information to allow many different types of leukocytes to be distinguished from each other, so that identification of leukocytes may be done merely by processing the limited amount of data which comprises the histogram rather than the unwieldy mass of data derived from scanning the image of a leukocyte, thereby rendering practical economical apparatus for use in differential counting of leukocytes.

As will become clear as the description proceeds, the scanning of a pattern to provide a video waveform and processing of the video waveform to provide a plurality of histogram function data values is also highly useful in methods and apparatus for classifying various patterns other than leukocytes.

Thus it is a primary object of the present invention to provide pattern-classifying or analyzing method and apparatus in which a pattern comprised of elemental areas having a multiplicity of shades or optical densities may be represented by a histogram function, and in which classification or analysis of the pattern may be based on processing a limited set of data values which define the histogram function.

As will become clear as the description proceeds, the provision of the histogram function representing a pattern may be done completely independently of the position or angular orientation of the pattern within the scanning field, so that no appreciable problems involving registration or orientation of the pattern are involved, and the method and apparatus is readily applicable to analysis of microscopic patterns wherein items of interest ordinarily located with randomly occurring positions and angular orientations, and thus it is a further object of the invention to provide method and apparatus which provides data characteristic of a pattern independently of the position and angular orientation of the pattern within the scanning field.

Other objects of the invention will in part be obvious and will, in part, appear hereinafter.

The invention accordingly, comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

FIG. **2*a*** illustrates a modified form of electronic switch unit and signal processor wherein histogram data values are obtained serially through plural scanning fields rather than from a single scanning field.

Figure 3:
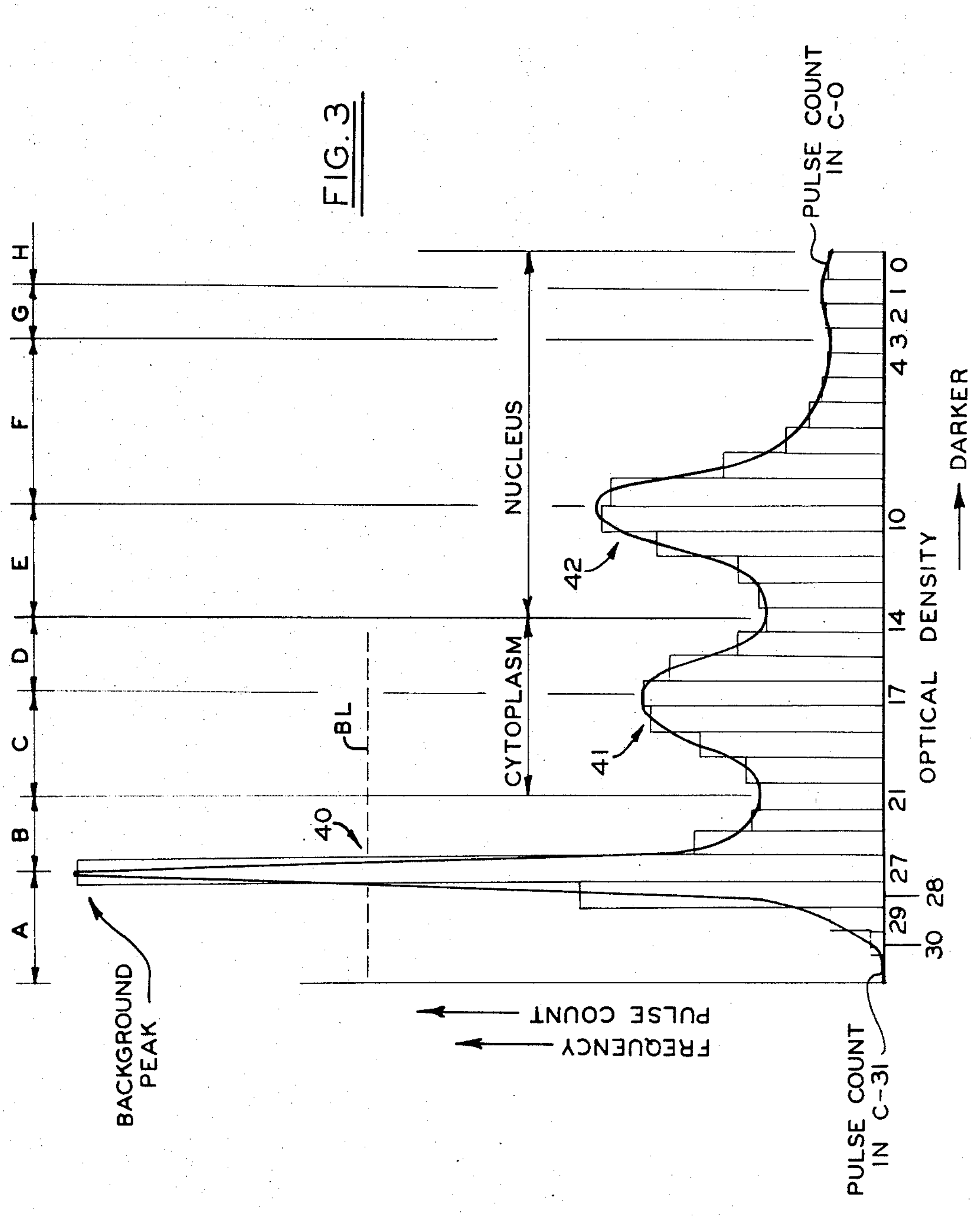

FIG. 3 is the plot of the histogram of a typical leukocyte.

Figure 2:
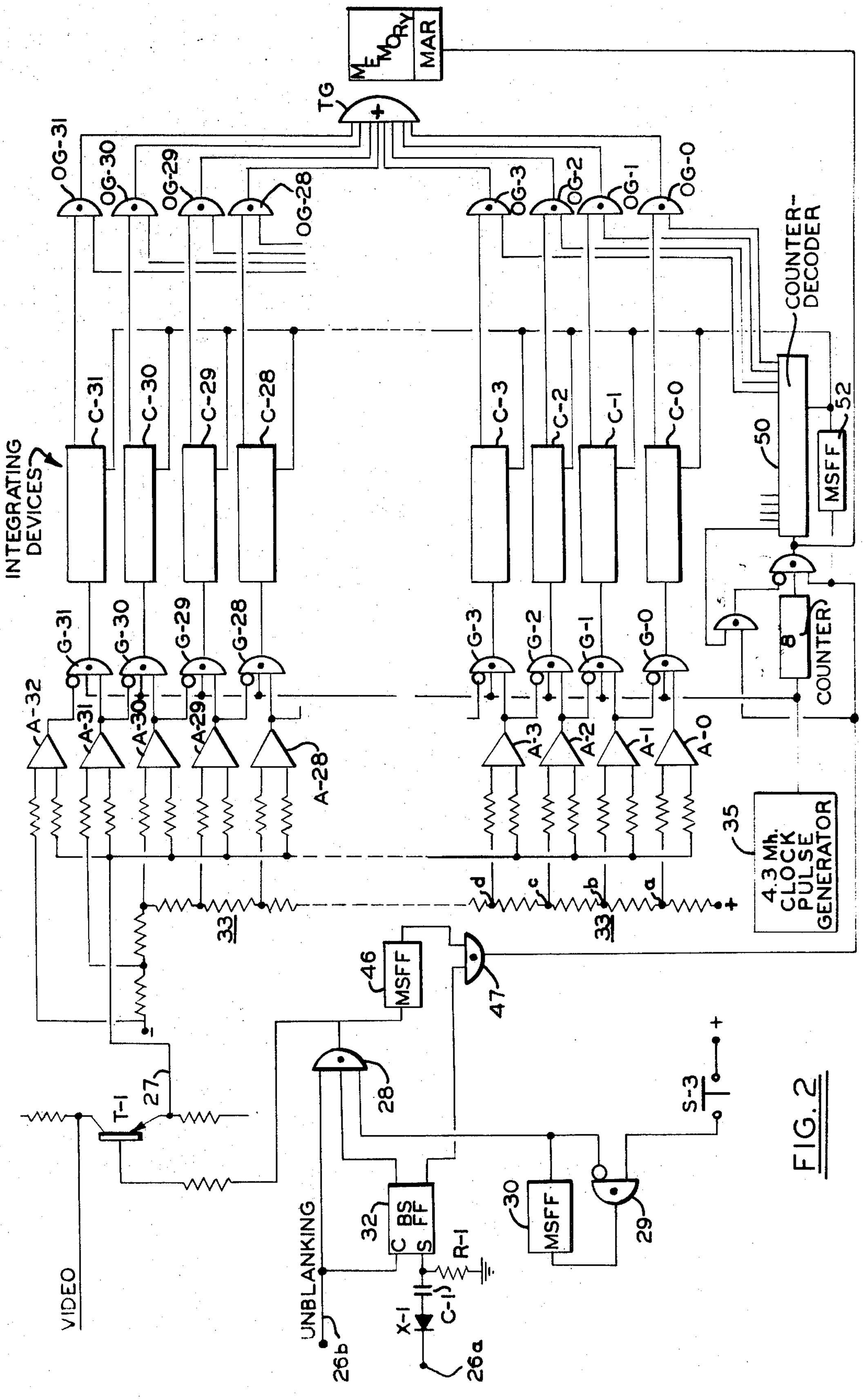
FIG. 2 is an electrical schematic diagram of an exemplary electronic switch unit and exemplary signal processor unit utilized in the system of FIG. 1, and also shows exemplary apparatus for storing values of a histogram function in digital form.
Figure 4:
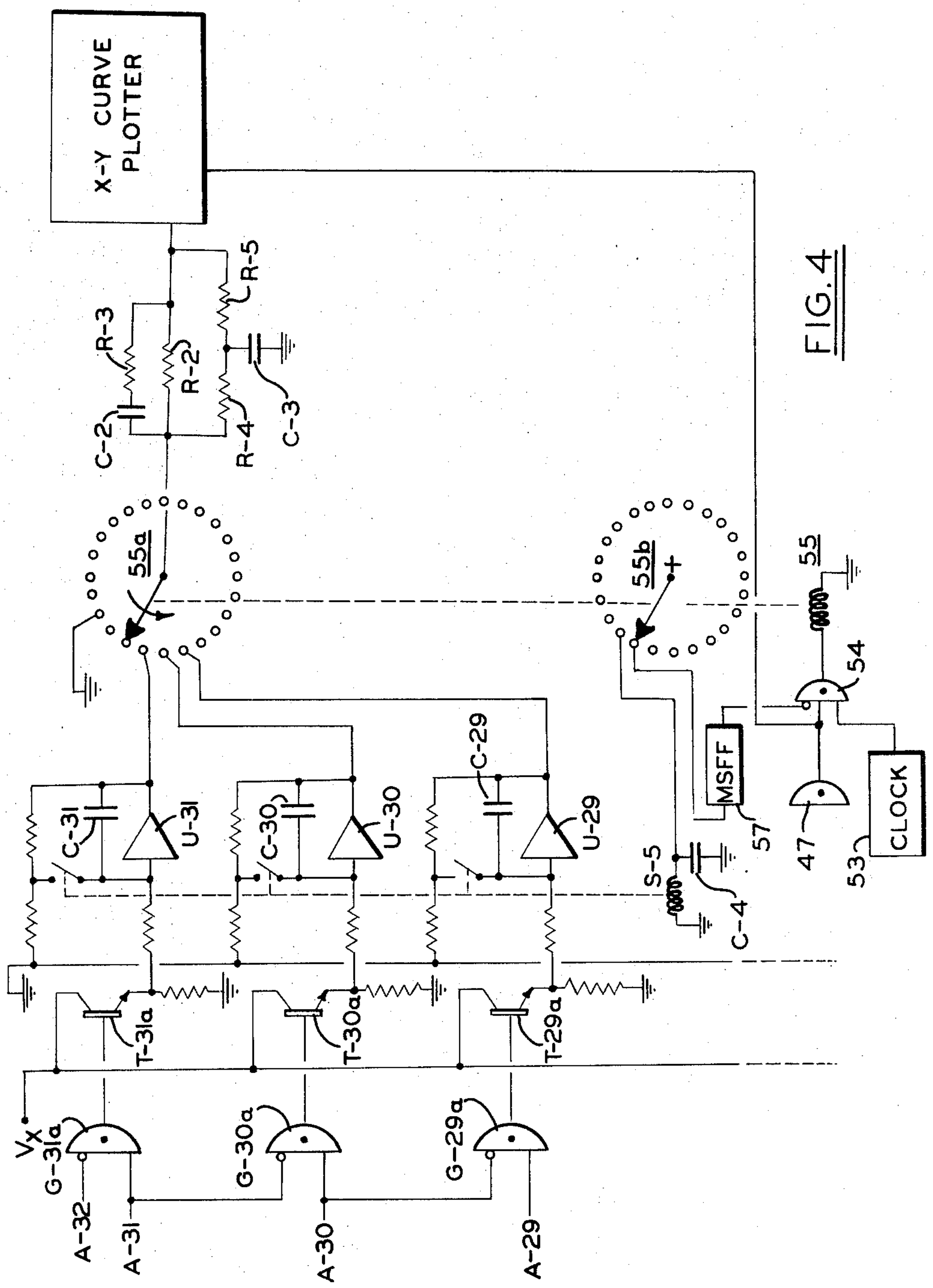

FIG. 4 illustrates modifications which may be made to the signal processor of FIG. 2 to provide histogram functions in the form of analog voltages, and illustrates exemplary apparatus for recording a histogram function.

Figure 5:
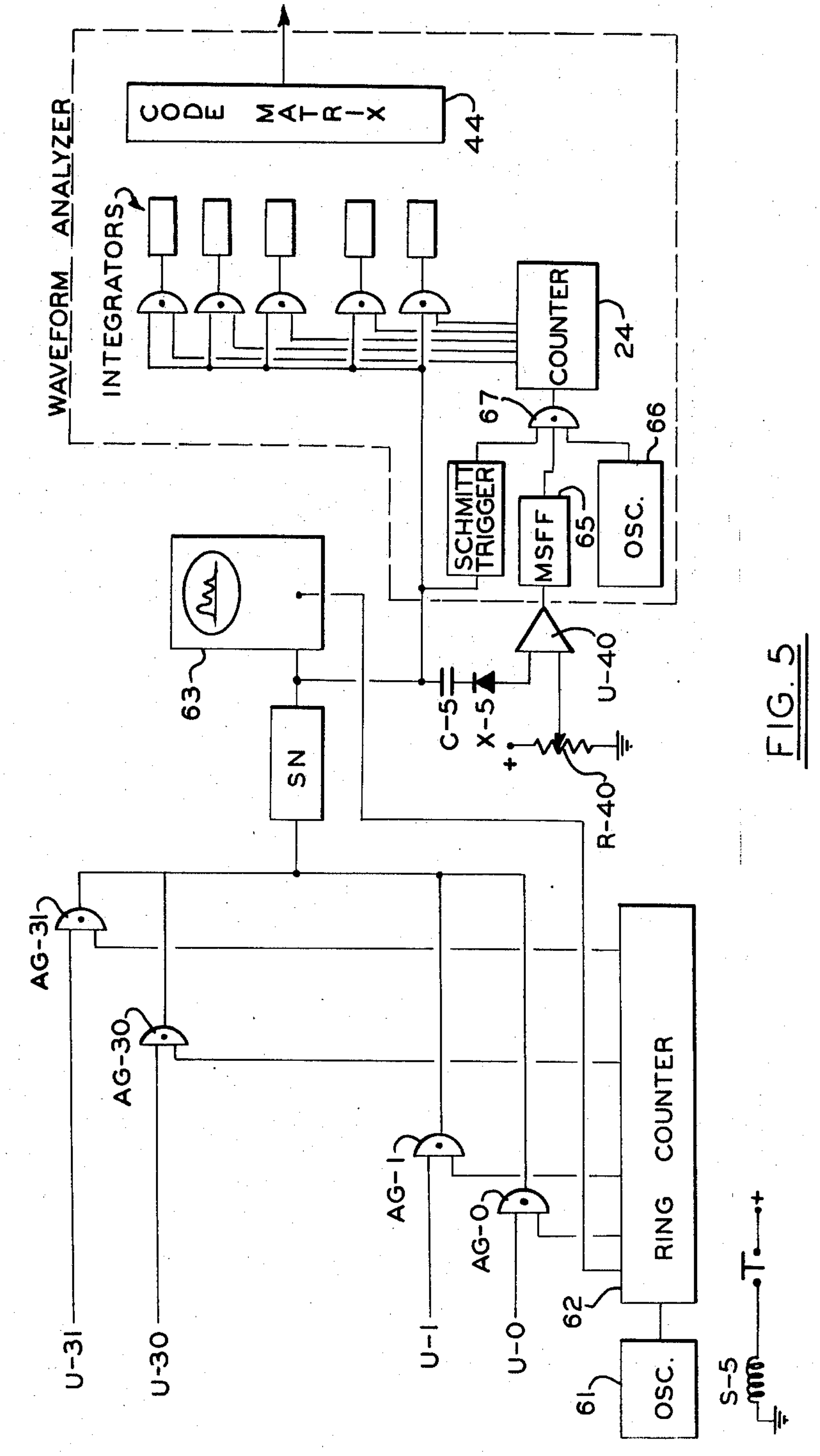

FIG. 5 illustrates further modifications which may be made to the apparatus of FIG. 4, and also illustrates apparatus for applying the histogram function to an oscilloscope and a waveform analyzer.

Figure 6:
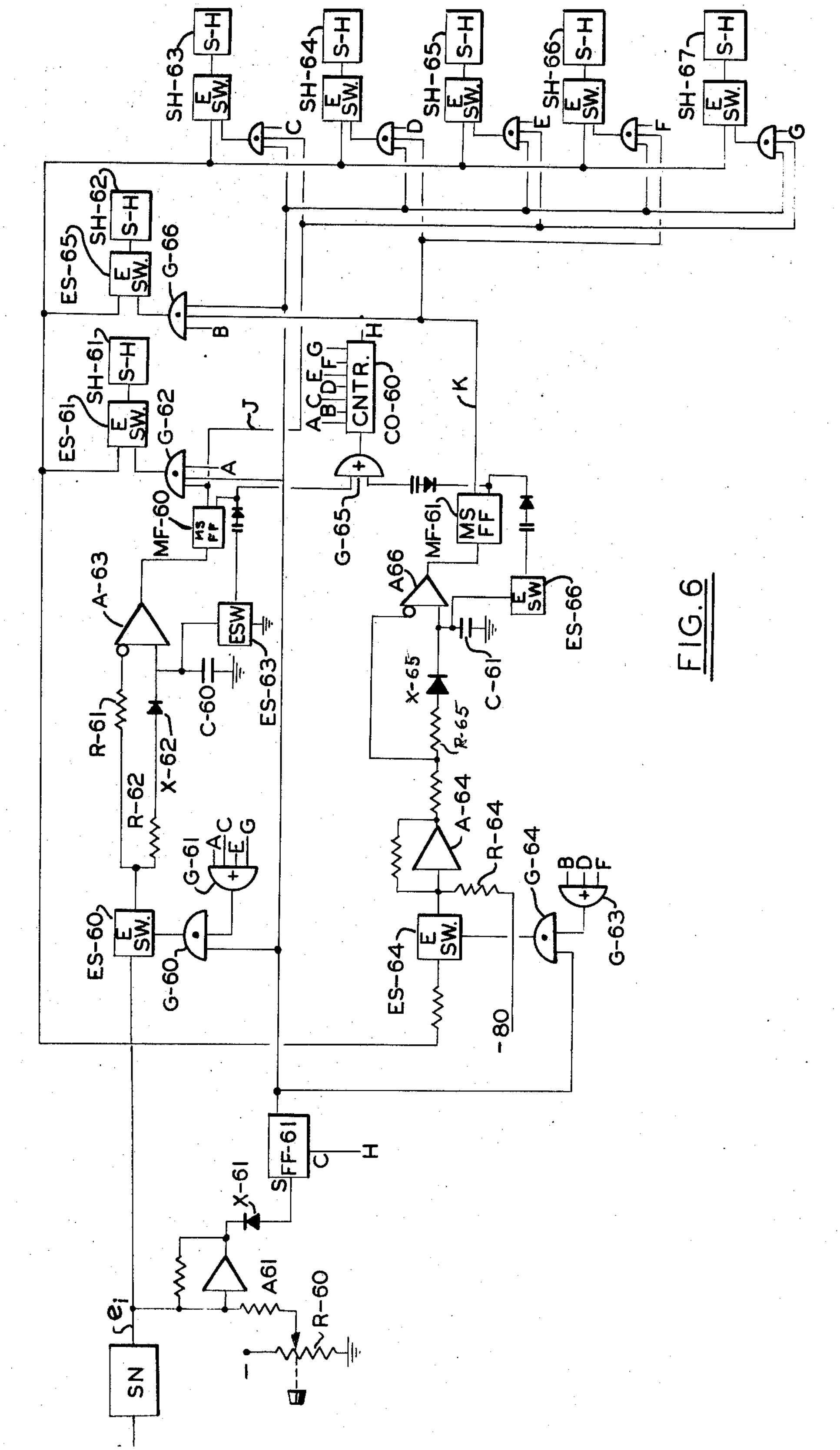

FIGS. 6 and **6*a*** are electrical schematic diagrams illustrating the principles of one exemplary form of histogram waveform analyzer which may be used with the present invention.

Figure 7:
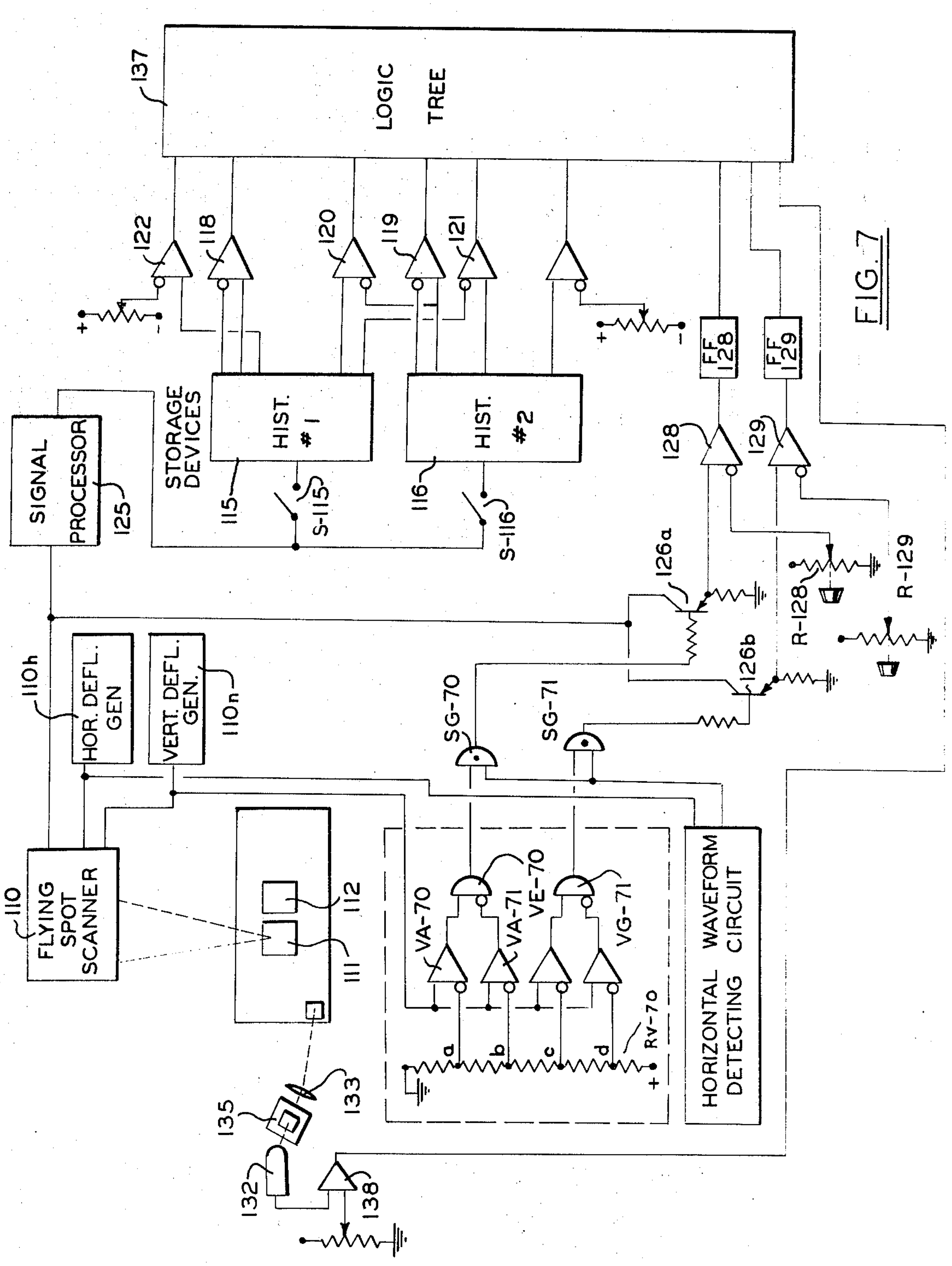

FIG. 7 is a schematic diagram illustrating pattern recognition apparatus for analyzing or identifying a document which incorporates various principles of the present invention.

Figure 1:
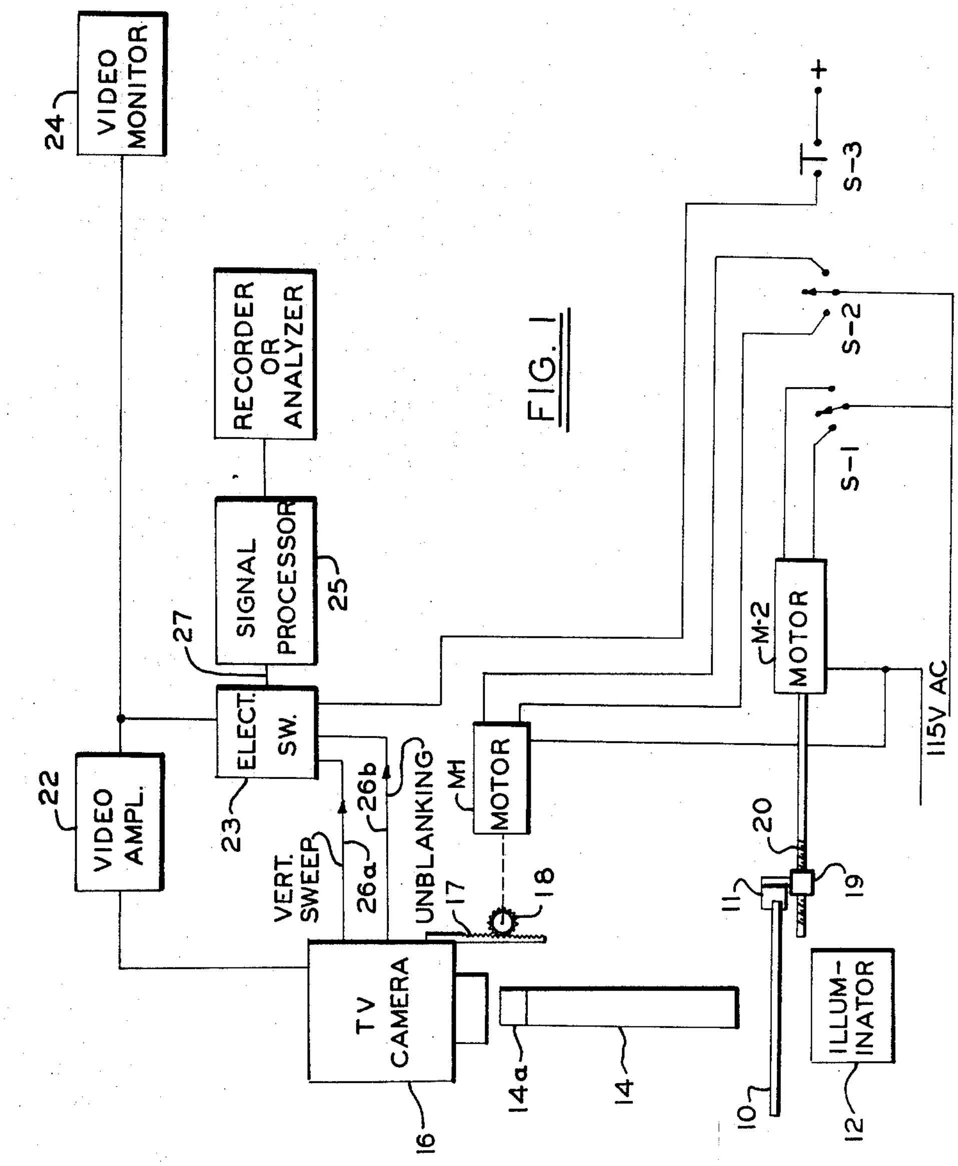
FIG. 1 is a schematic block diagram of one form of leukocyte analysis apparatus constructed in accordance with the present invention.

In FIG. 1 a conventional microscope glass slide 10 carried in slide mount 11 is shown illuminated by a conventional microscope illuminator 12, which is preferably operated from a regulated voltage supply, and light from illuminator 12 is directed upwardly as viewed in FIG. 1 through slide 10 and a blood sample carried thereon, to a conventional laboratory light microscope 14. The image of the sample viewed on slide 10 is focused on the image plane of a conventional television camera 16 by optical focusing means shown as comprising motor M–1 which vertically positions camera 16 relative to eye piece **14*a* of microscope 14 through rack 17 and pinion 18. Various other arrangements for varying the magnification of the image seen by camera 16** may be substituted without departing from the invention, including, for example, zoom lens systems. It is important, however, that any such system be achromatic.

The video output signal from camera 16 is applied, through conventional video amplifiers 22 if desired, to electronic switch circuit 23 and to a conventional video monitor 24. The sweep and blanking circuits of camera 16 and monitor 24 are interconnected in conventional fashion to operate in synchronism.

Slide mount 11 is shown mechanically connected to be moved horizontally by means shown as comprising threaded nut 19 on the threaded shaft 20, which is rotated slowly by gear motor M–2, in one direction or the other, as determined by operator control of spring-centered switch S–1, thereby enabling the operator to position different portions of the sample, or different leukocytes, to be viewed by microscope 14 and television camera 16. If desired, a further motor or other drive means (not shown) and a further switch (not shown) may be provided to allow the operator to shift slide 10 in a perpendicular direction (i.e. perpendicular to the plane of FIG. 1). If desired a commercially known form of slide positioning mechanism frequently used with laboratory microscopes may be utilized to move the slide automatically in what is known as a "-battlement" pattern so that edges of the smear periodically pass through the field of view. As different portions of the slide appear on the field of view of microscope 14 the operator views them on video monitor 24. When an image of a leukocyte of interest to the operator appears on the screen of monitor 24 the operator releases switch S–1 to stop translation of slide 10 and operates switch S–2 to vary the optical system magnification so that the leukocyte fills a large portion of the screen on monitor 24. Then by depression of pushbutton switch S–3 the operator applies a signal to electronic switch circuit 23. The electronic switch circuit 23, which is described below in detail in connection with FIG. 2, then connects the video signal from camera 16 into signal processor 25. In the form of the invention illustrated in FIG. 1 electronic switch 23 applies the video signal to processor 25 during the duration of a single frame (or a single field comprised of several interlaced frames) of scanning by camera 16, while in various other forms of the invention, switch circuit 23 is arranged to apply the camera output video signal to processor 25 during plural successive frames or fields. The vertical sweep waveform and unblanking waveform of camera 16 are applied via lines 26*a* and 26*b* to switch circuit 23 to insure that electronic switch 23 closes at the beginning of a camera frame even if switch S–3 closure occurs during the middle of a camera frame, and as will be seen below, electronic switch 23 remains closed for a single frame, even though manual operation of momentary pushbutton switch S–3 ordinarily closes switch S–3 throughout the time of a number of frames.

The application of one frame camera 16 output video signal to signal processor 25 results in a plurality of signals defining a histogram of the leukocyte from signal processor 25. These signals are applied to an output device, which may comprise a simple curve plotter or other form of signal storage device, or alternatively, which may comprise one of several types of analyzing devices for interpreting the histogram.

In a typical embodiment of the invention the microscope 14 optical system may be provided with a power of the order 1,000, so that a leukocyte approximately 10 microns in diameter fills much of the scanning raster of approximately 1.25 by 1.66 cm. in camera 16, and camera 16 may utilize conventional horizontal and vertical sweep circuits of 15,750 and 60 cps and an unblanking circuit to provide a conventional 500-line" raster.

Before proceeding to a description of signal processor 25, it may be noted that the invention is applicable to the scanning of photographs or electron micrographs of leukocytes as well as to direct scanning of leukocytes, and that a considerably different order of magnification not requiring a microscope then may be used in the optical system between the photograph or micrograph and the television camera. Also, while I prefer to use a conventional vidicon television camera, it should be understood that a flying spot scanner may be utilized in FIG. 1 to direct light down through the eyepiece and microscope objective, through slide 10, and through a conventional condenser lens system to a photomultiplier tube in lieu of camera 16, to provide a comparable video signal. The synchronizing and unblanking signals on lines 26*a* and 26*b* for electronic switch 23 then would be derived from the flying spot scanner vertical sweep waveform, of course. Furthermore, Nipkow disc scanners obviously could be used in lieu of cathode ray tube flying spot scanners. Also, it will be apparent that the scanning of illuminated photographs or electron micrographs may be done using either a vidicon camera or a flying spot scanner arranged to receive light reflected from an opaque photograph or like pattern, or light transmitted through a transparency. Inasmuch as optical density varies with the logarithm of the light sensed by the camera, the overall amplification provided within the camera and within video amplifier 22 desirably may be arranged to approximate a logarithmic characteristic, so that the level of the output signal from amplifier 22 varies approximately linearly with optical density, but precise logarithmic amplification, is in no way necessary. If amplifier 22 provides logarithmic amplification, a further input (not shown) of opposite sense to the amplifier commensurate with illumination intensity may be applied, so that the amplifier 22 output varies substantially in accordance with optical density. A signal commensurate with illumination intensity may be derived in a variety of ways, such as by using a photosensor which views the illuminator directly, or by using a photosensor which views a background portion of the scanned field through the microscope and a beamsplitter (not shown) interposed between the microscope and the camera, or by sensing the camera output signal as a background portion of the field is scanned.

The video signal from amplifier circuit 22 may be applied to an electronic switching circuit 23 of the nature shown at the left side of FIG. 2. The video signal is shown applied to the collector of emitter-follower transistor T–1 and is applied via line 27 to the signal processor when a positive signal is applied to the transistor base from and gate 28. Depression of momentary switch S–3 by the operator momentarily enables gate 29 to temporarily set monostable flip-flop 30, thereby applying a logic 1 signal to one input line of gate 28 for the set duration of flip-flop 30, which may be selected to be several seconds. The setting of flip-flop 30 also immediately disables gate 29, so that continued depression of switch S–3 by the operator for as long as one second or more has no further effect. The camera 16 vertical sweep signal, which is assumed to be a positively increasing ramp with a negative-going reset excursion, is applied via line 26*a*, and hence the vertical retrace of the camera applies a signal via diode X–1 and RC differentiator R–1, C–1 to set bi-stable flip flop 32 and apply a further input to conditionally enable gate 28. The camera tube unblanking signal then enables and gate 28, thereby closing transistor switch T–1 to apply the video signal from the camera to the signal processor during the ensuing frame, until the fall of the unblanking signal disables gate 28, and also clears flip-flop 32.

The video signal on line 27 is applied to each of a plurality of differential amplifiers, *n*+1 of which are utilized if *n* different shades of gray, or optical density levels, are to be detected. FIG. 2 assumes the use of 33 differential amplifiers numbered A–0 through A–32, only the first four and last four of which are shown. Each of the differential amplifiers may comprise a Fairchild Type 710C, for example, capable of very rapid switching (40 nanosecond) and having low input voltage offset (e.g. 1.6 millivolt). Each amplifier is provided with very high gain, so that a small net input voltage in one direction or the other causes the amplifier output to swing to saturation in one direction or the other. It is essential that the amplifiers require very little time to switch front one saturated condition to another. Also applied to each differential amplifier is a reference voltage shown derived from a multitap voltage divider 33, only the upper and lower ends of which are shown in FIG. 2. Assume for sake of explanation that the voltages applied from taps *a*, *b*, *c* and *d* of the voltage divider reference supply to amplifiers A–0, A–1, A–2 and A–3 are zero and minus 10, 20 and 30 millivolts, respectively. When the video signal on line 27 is negative, all of the difference amplifiers will provide negative output signals directly to correspondingly numbered gates, and all of the gate circuits G–0 through G–31 will be disabled. As soon as the video signal on line 27 positively exceeds zero volts, it will be seen that amplifier A–0 will provide a positive output and gate G–0 will be enabled, thereby passing clock pulses from clock pulse generator 35 to integrating device C–0, which may comprise a conventional digital or electronic pulse counter, of either a binary type, or a decimal type, or one of may other known types. As the video signal increases positively from zero to a +10 millivolt level gate G–0 will remain enabled and clock pulses will be passed to advance counter C–0. When the video signal exceeds +10 millivolts, however, the output signal from amplifier A–1 will swing positive, thereby applying an inhibiting signal to disable gate G–0, and simultaneously gate G–1 will be enabled, so that clock pulses will then be gated to counter C–1 instead of to counter C–0. As the video signal increases above 20 millivolts amplifier A–2 will disable gate G–1 and enable gate G–2 so that clock pulses are gated to counter C–2, and as the video signal increases above 30 millivolts, amplifier A–3 will disable gate G–2 and enable gate G–3, so that clock pulses then will be routed to counter C–3. Thus each amplifier will be seen to be arranged to enable one gate circuit to route pulses to a respective counter, and each amplifier (other than the first, A–0) arranged to disable a previously-enabled lower order gate circuit, whenever the video signal crosses a reference level established by the voltage divider input potential applied to the amplifier. The last amplifier A–32 disables gate G–31, but does not gate pulses to a counter.

As the video signal varies during the single frame of scanning, it will be seen that clock pulses will be applied at any time to a selected counter in accordance with the instantaneous amplitude level of the video waveform, and hence upon completion of the frame, counts will be accumulated in counters C–0 through C–31 with a distribution which corresponds, for a given counter, with the amount or area of the scanned image which contained matter having a given optical density. If a less dense image is arranged to provide a more positive video signal level, it will be understood that scanning light or non-dense image portions will accumulate counts in the higher-numbered counters, e.g. C–30 and C–31, while the scanning of dark or dense image portions will accumulate counts in the lower numbered counters, e.g. C–0 and C–1. If the dark-light sense or polarity of the video signal is reversed, dark image portions will instead augment the count in the higher numbered counters and vice versa, of course.

The reference voltages shown derived from voltage divider 33 preferably comprise a set which increases in a linear fashion, i.e. in equal voltage increments, but it is possible and within the scope of the invention to utilize unequal increments, to define some optical density levels more narrowly than others, and the taps on voltage divider 33 may be made adjustable, of course. If approximately logarithmic amplification is not supplied by video amplifier 22, the taps on voltage divider 33 preferably will have irregular spacing so as to define approximately equal ranges of optical density.

The output signal from gate 28 at the start of the frame also sets monostable flip-flop 46, which has a period somewhat longer than one frame time. When the fall of the unblanking signal clears flip-flop 32 to signify the end of the frame, the outputs from flip-flops 32 and 46 enable AND gate 47 for approximately 40 microseconds or longer, in turn enabling AND gate 48, which is fed pulses at approximately a 0.5 Mh. rate from clock pulse generator 35 via an "8" counter 49. The pulses fed through gate 48 advance the counter of counter-decoder circuit 50, and also advance the memory address register MAR of a digital computer memory. During successive count conditions successive ones of 32 decoder output lines enable successive ones of a set of 32 gate circuits OG–0 through OG–31 to successively connect the contents in counters C–0 through C–31 to the memory input data lines through OR gate circuit TG. Though shown schematically as single gates, gate circuits OG–0 through OG–31 and TG each actually may comprise a group (such as 10 or 12, for example) of gates, so that the contents of a counter are applied in parallel to be stored in the computer memory. After counter-decoder 50 has advanced through 32 count conditions and reaches a further count condition, a further decoder output line enables and gate 51, which applies an input to disable gate 48, thereby preventing further advancement of counter-decoder 50, and then shortly thereafter the reset of flip-flop 46 and consequent disabling of gate 47 pulses monostable flip-flop 52, which activates the reset lines of the counter in counter-decoder 50 and the reset lines of counters C–0 to C–31 to reset them to a zero or other desired reference count condition. And then the circuit of FIG. 2 is ready to accept a further video waveform from the scanning of a further leukocyte. A card punch or a magnetic tape unit may be substituted for the computer memory (assumed to be a core memory) shown, of course, and various other digital storage means may be used, including digitally-set switch-resistor networks which convert each digital count to an analog current or voltage.

FIG. 3 contains a bar graph in which the counts accumulated in the 32 counters during the scanning of a typical or hypothetical leukocyte are plotted as ordinates against a linear scale with the count of the highest-numbered counter C–31, which counts the lightest elemental areas shown at the left, and the count of the lowest numbered counter C–0, which counts the darkest elemental areas of the image, shown at the right. A smooth curve is also shown drawn to interpolate between the 32 pulse counts. It may be noted here that a variety of different interpolation methods may be used to interpolate between the 32 values, including, for example, linear interpolation or parabolic interpolation, or one of a number of methods discussed at pp. 746 et seq. of "Mathematical Handbook for Scientists and Engineers," Korn and Korn, McGraw-Hill, 1968.

In FIG. 3 the extremely high peak 40 at the left represents the substantial background or surrounding area which was scanned along with the leukocyte, together with the area of completely transparent portions, if any, of the leukocyte. The height of the peak, which corresponds to the number of pulses counted in counter C–27, depends, of course, on how much of the total scanned image area was background, and by altering the optical system magnification, the operator may vary the relative percentages of the field of view which are occupied by the leukocyte and by background. As will be seen below, adjustment of system magnification so as to include a substantial amount of background area and provide a very high peak at a very low density level advantageously simplifies later machine analysis of the histogram data by providing a reference point for the histogram data. Variation of the illumination applied to the system by illuminator 12(FIG. 1) results in horizontal shifting of the histogram function in FIG. 3. For example, if a decrease in illumination results in a less positive video signal, each elemental area of a given density will be recorded in a lower numbered counter, thereby shifting the entire function to the right in FIG. 3, while an increase in illumination would shift the function to the left.

The central peak 41 of the histogram represents cytoplasmic area and features of medium density of the leukocyte, while the righthand peak 42 represents the nucleus, or most dense portions of the leukocyte. From a histogram such as that shown in FIG. 3, one may measure or calculate a variety of parameters which aid in classification of a leukocyte, including as examples:

1. nuclear-cytoplasmic contrast (e.g. the difference between the counts in counters C–10 and C–17).
2. cytoplasmic integrated optical density (e.g. the sum of the counts in counters C–14 through C–21).
3. means optical density ratio between nucleus and cytoplasm (e.g. the ratio between the average of the counts in counters C–0 through C–13 and the average of the counts in counters C–14 through C–21).
4. nuclear area (e.g. the sum of the counts in counters C–0 through C–13).
5. optical density mode for cell (e.g. count in the counter C–10).
6. standard deviation of cell optical densities (e.g. difference between count in counter C–10, or C–17 if it were larger, and count in counter C–3, the lowest count for any cell area).
7. standard deviation of nuclear optical densities (e.g. difference between count in counter C–10 and count in counter C–3).
8. optical density mode for cytoplasm (e.g. count in counter C–17).
9. cell integrated optical density (e.g. sum of counts in counters C–0 through C–21).
10. cell mean optical density (e.g. average of counts in counters C–0 through C–21).
11. frequency at nuclear optical density peak (e.g. count in counter C–10).
12. cytoplasmic mean optical density (e.g. the weighted average of the counts in counters C–14 through C–21).
13. cytoplasmic area (number of counters between C–14 and C–21, which are shown at the bounds of the cytoplasmic area in FIG. 3).

FIG. 4 illustrates modifications which may be made to the signal processor of FIG. 2 in order to provide a histogram function by means of a set of analog voltages instead of by a set of digital numbers. In FIG. 4 gates G–31*a*, G–30*a*, G–29*a* correspond in principle to gates G–31, G–30 and G–29 of FIG. 2, and the major distinction is that none of the gates receive clock pulses. As in FIG. 2, however, each gate receives the output from an associated differential amplifier on a non-inverting input line, and the output from the adjacent higher-numbered differential amplifier on an inverting input line. It will be apparent at this point without further explanation that each gate (such as G–31*a*, G–30*a*, G–29*a* will provide an output signal whenever the video signal is great enough to exceed the reference signal applied to the amplifier connected to the non-inverting input line of the gate, so long as the video signal does not exceed the reference signal applied to the adjacent higher order amplifier and result in an inhibiting input to the gate.

When a gate such as G–31*a* provides a logic 1 output, it applies a positive voltage to turn on an associated transistor switch, such as T–31*a*. Output signals from gates G–30*a* and G–29*a* turn on transistor switches T–30 and T–29*a*, respectively. Each transistor switch is connected as an emitter follower, so that turning it on applies a predetermined voltage $V_x$ from the transistor switch through a scaling resistor to an analog (Miller) integration circuit. Each analog integration circuit comprises an operational amplifier (such as U–31, U–30, U–29, etc.) and a feedback capacitor (such as C–31, C–30, C–29, etc.). Whenever the video signal exists between a particular pair of reference levels, indicating that the area being scanned has a particular density and energizing a given one of the gates G–0*a* to G–31*a*, the measured or predetermined amplitude voltage $V_x$ will be applied by one of the transistor switches of the group T–0*a* to T–31*a* to an associated analog integrator circuit, thereby causing the integrator circuit output voltage to increase, so long as the switch is closed, at a rate governed by the magnitude of reference voltage $V_x$. Thus it will be understood that when the scanning of the single frame is completed, the various integrator circuits will provide various voltages at their output terminals, with those integrators associated with quite prevalent density levels having higher output voltages at the end of the frame.

After scanning of the single frame is completed, as is indicated by the enabling of gate 47, pulses are applied from clock pulse source 53 through and gate 54 to advance stepping switch 55, thereby connecting the analog integrator output voltages successively to a conventional curve plotter, through a complex impedance having a direct-coupling resistance R–2, a lead network comprising resistor R–3 and capacitor C–2, and a lag network comprising resistors R–4, R–5 and capacitor C–3. Simultaneously, the output signal from gate 47 causes the analog recorder or curve plotter to advance its paper feed at a predetermined constant rate. Connection of the successive analog integrator output voltages to the plotter will be seen to result in a graphic waveform being traced, with the inertia of the plotter pen mechanism and the complex input network associated with the plotter serving to smooth over or interpolate between the discrete analog voltages which are applied in succession to the plotter, thereby providing a relatively smooth histogram from the curve plotter.

When the stepping switch has sampled the last of the 32 analog integrator output voltages, the translation of the stepping switch through several further positions results in energization of relay S–5, which connects each integrator output terminal and a grounded input terminal to the integrator summing junction, thereby causing each integrator circuit to drive its output voltage rapidly to a zero voltage level. Capacitor C–4 keeps relay S–5 closed as the wiper arm of the lower deck **55*b* of the stepping switch transfers between successive contact positions, only four such positions being shown in FIG. 4. Finally the stepping switch reaches a last position, which causes monostable flip-flop or pulser 57 to apply a temporary inhibiting input to gate 54, thereby preventing further advancement of the stepping switch until after the fall of the output from gate 47**.

While an electronic selector switch system has been shown in FIG. 2 for sampling the electronic counter outputs successively and an electromechanical selector switch system shown in FIG. 4 for sampling analog integrator out outputs, it will be readily apparent to those skilled in the art that either type of selective switching system can be used with either type of integrating device.

Rather than being applied successively to a curve plotter, the analog voltage outputs may be applied to trace the histogram function on an oscilloscope, using an arrangement typified by FIG. 5, wherein each analog integrator output is shown connected through an electronic switch. Only four of the 32 integrator output lines are shown and each analog electronic switch is shown as a simple and gate for convenience. Oscillator 61 cycles ring counter 62, and outputs from successive stages of counter 62 enable the electronic switches AG–31 to AG–0 in succession, thereby sampling the 32 analog voltages in succession and applying each through smoothing network SN to the Y axis input of conventional oscilloscope 63, the horizontal sweep trigger of which is supplied by a further stage of ring counter 62. Reset relay S–5 is operated manually in FIG. **4*a*, so that the integrators will not be reset automatically as in FIG. 4, and so that the histogram may be traced repeatedly on scope 63 as many times as desired. If a so-called "memory scope" having a long-persistence screen phosphor is used, the set of integrator outputs need by sampled only once, of course, and automatic integrator reset of the nature shown in FIG. 4** may be used.

The analog output voltages from the integrators may be applied to various other analog function storage devices, such as to position a plurality of conventional servo-set potentiometers, for example, to store the histogram function, or the analog waveform provided by sampling the integrator output voltages successively may be applied to any one of a number of different waveform analysis and identifying devices. In FIG. 5 the analog waveform is also shown applied to a waveform identifying device shown within dashed lines which may be of the type shown in U.S. Pat. No. 2,992,408 issued July 11, 1961 to Eldredge et al. The waveform from smoothing network SN is applied via capacitor C–5 and diode X–5 to differential amplifier U–40, and an opposite sense bias voltage is applied to amplifier U–40 from potentiometer R–40. The output of amplifier U–40 is normally positive, but as the trailing edge of the background peak of the histogram occurs, the negative input through C–5 and X–5 exceeds the positive bias, making the amplifier U–40 output swing negative. Monostable flip-flop 65 is then set for the duration of the waveform, so that pulses from oscillator 66 are passed through gate 67 to advance counter 24, thereby applying successive temporal portions of the histogram waveshape to respective ones of a plurality of Miller integrators. The integrator outputs are connected through normalizing circuitry and other circuitry not shown, eventually to apply signals to code matrix 44 to identify the waveform. Several other waveform analyzing devices to which the histogram waveform may be applied are shown in U.S. Pat. Nos. 3,000,000 and 2,924,812. Each such device may compare the histogram waveform with stored data representing the histogram function of a known pattern, such as a known type of leukocyte, and provides an indication identifying the scanned pattern as corresponding to one of a set of known patterns.

In a modified arrangement illustrated in FIG. **2*a* a single double-ended comparator comprising amplifiers AA and AB is multiplexed to receive successive pairs of reference voltages, and the output of gate GG is multiplexed to apply clock pulses successively to all of the integrating devices C–0 through C–31. Depression of pushbutton S–3*a* enables gate 28*c* during the first ensuing vertical retrace of camera 16, and the output of gate 28*c* sets flip-flop 32*a*, enabling gate 28*a* so that successive retraces of the camera slow (vertical) sweep advance ring counter CO–2 after each scanning field and raise successive ones of its output lines, which are labelled HO through H32. With flip-flop 32*a* set gate 28*b* is enabled during successive frames while camera 16 is unblanked, closing switch T–1 and connecting the video waveform to amplifiers AA and AB. When counter CO–2 is in its zero state line HO closes electronic switch ES–20, thereby applying the reference level voltage from tap a of voltage divider 33***a* to amplifier AA, and thereby applying that reference level voltage, less a predetermined voltage selected by potentiometer R–21*a*, to amplifier AB, via summing amplifier A2A and inverting amplifier A2B. Amplifiers AA and AB will be seen to function like any adjacent pair of amplifiers in FIG. 2, to enable gate GG whenever the video waveform applied through T–1 lies between the two reference voltages applied to the two amplifiers, so that clock pulses will pass through gate GG. During the zero state of counter CO–2 the HO line enables gate GO–*a*, so that the clock pulses are routed to counter C–0. As successive frames are scanned by camera 16, counter CO–2 successively applies different reference voltages to amplifiers AA and AB, and successively applies the pulse output from gate GG to successive ones of the 32 counters C–0 through C–31. Use of amplifier A2A and potentiometer R–21*a* to subtract a predetermined voltage from the reference voltage applied to amplifier AA allows one to use a single set of electronic switches to provide the two sets of reference voltages needed by amplifiers AA and AB, but it does require that successive density levels be established by equal voltage increments. When counter CO–2 has scanned 32 frames, the raising of the H32 line resets flip-flop 32*a*, disabling gates 28*a* and 28*b*, and at that time the 32 counters C–0 to C–31 will be seen to have the same data stored in them as was obtained in FIG. 2 with a single camera frame. Gates (not shown) similar to gates OG–0 through OG–31 then may be used to transfer the counter outputs elsewhere.

Figure 2A:
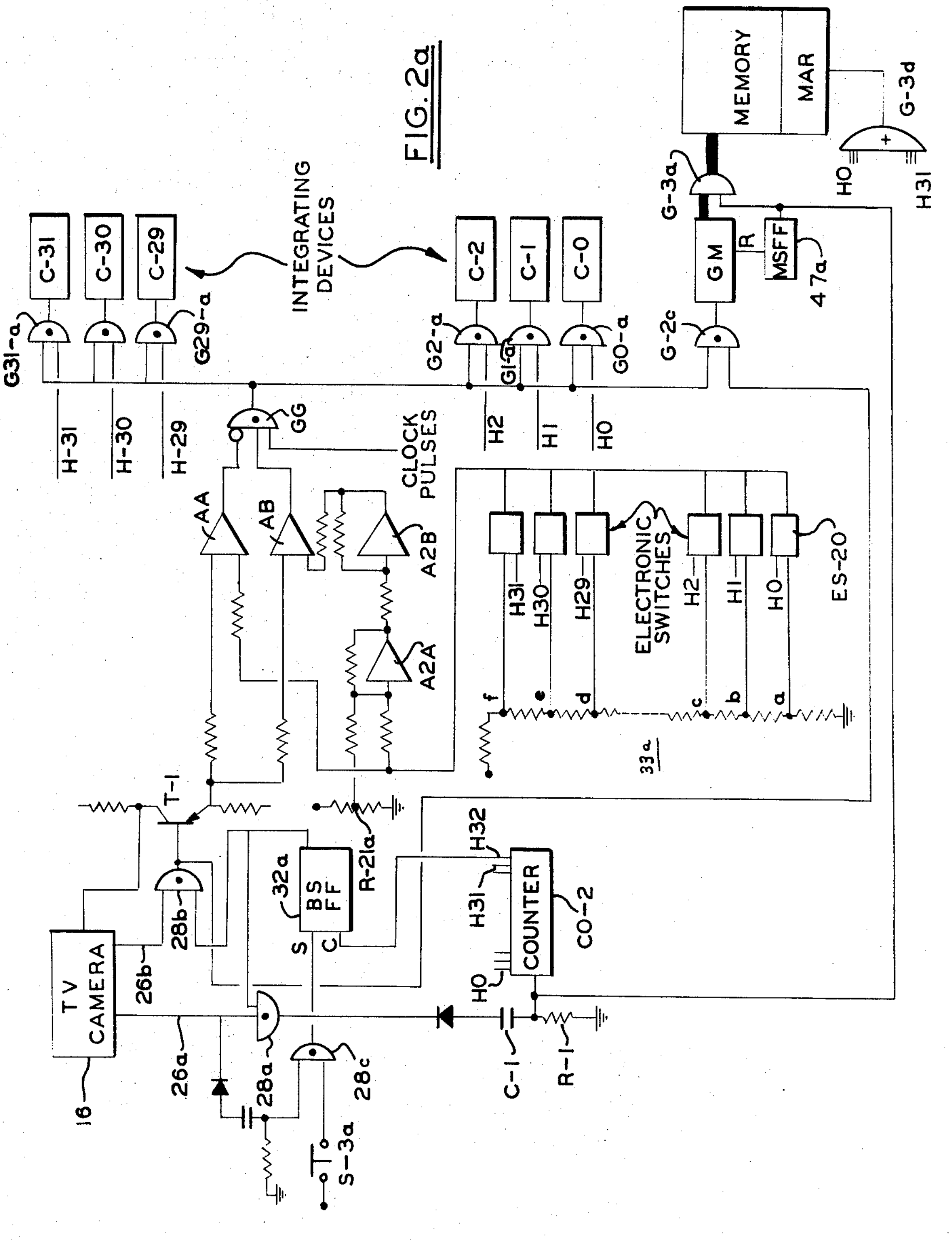

In many applications it is unnecessary to provide 32 counters such as C–0 to C–31, by using an alternative arrangement also shown for convenience of illustration in FIG. 2*a*, wherein the output of gate GG is also shown applied to a single digital counter GM through gate G–2*c* which is closed whenever gate 28*b* is enabled. The contents of counter GM are transferred in parallel to memory M through gate system G–3*a* (shown for convenience as a single gate) at the end of each of the 32 fields, the vertical retrace also serving to enable gates G–3*a*, and the counter CO–2 outputs are connected through or gate G–3*d* to advance the memory address register MAR. Shortly after the counter GM contents are transferred each time an output from monostable flip-flop 47*a* resets counter GM. If gate G–2*c* and counter GM are used, counters C–0 through C–31 and gates GO–*a* through G31–*a* are unnecessary, of course.

It will be apparent at this point that the comparator multiplexing arrangement of FIG. 2*a* is as readily applicable to the analog integrator arrangement of FIG. 4, and further that a single analog integrator may be used in the manner of counter GM, with counter lines HO through H31 each ANDed separately with the vertical retrace to connect the integrator successively to each one of 32 sample-hold circuits (not shown), and with the vertical retrace being used to reset the integrator to a reference output voltage condition after the integrator output voltage is sampled each time. Because analog integrator reset may desirably require considerably more time than that required for reset of a digital counter, such a system may desirably utilize two analog integrators, with the gate G–2*c* output being alternately applied to them during alternate successive fields, or, if desired, a single integrator may be used, with 64 states provided in counter CO–2 instead of 32, with odd number states arranged to reset the integrator. Obviously, by provision of sufficient stages in counter CO–2, as many counter states (i.e. camera fields) as are necessary to fully reset the integrator may be provided between each field during which the gate G–2 *c* applies current to charge the integrator.

Figure 6A:
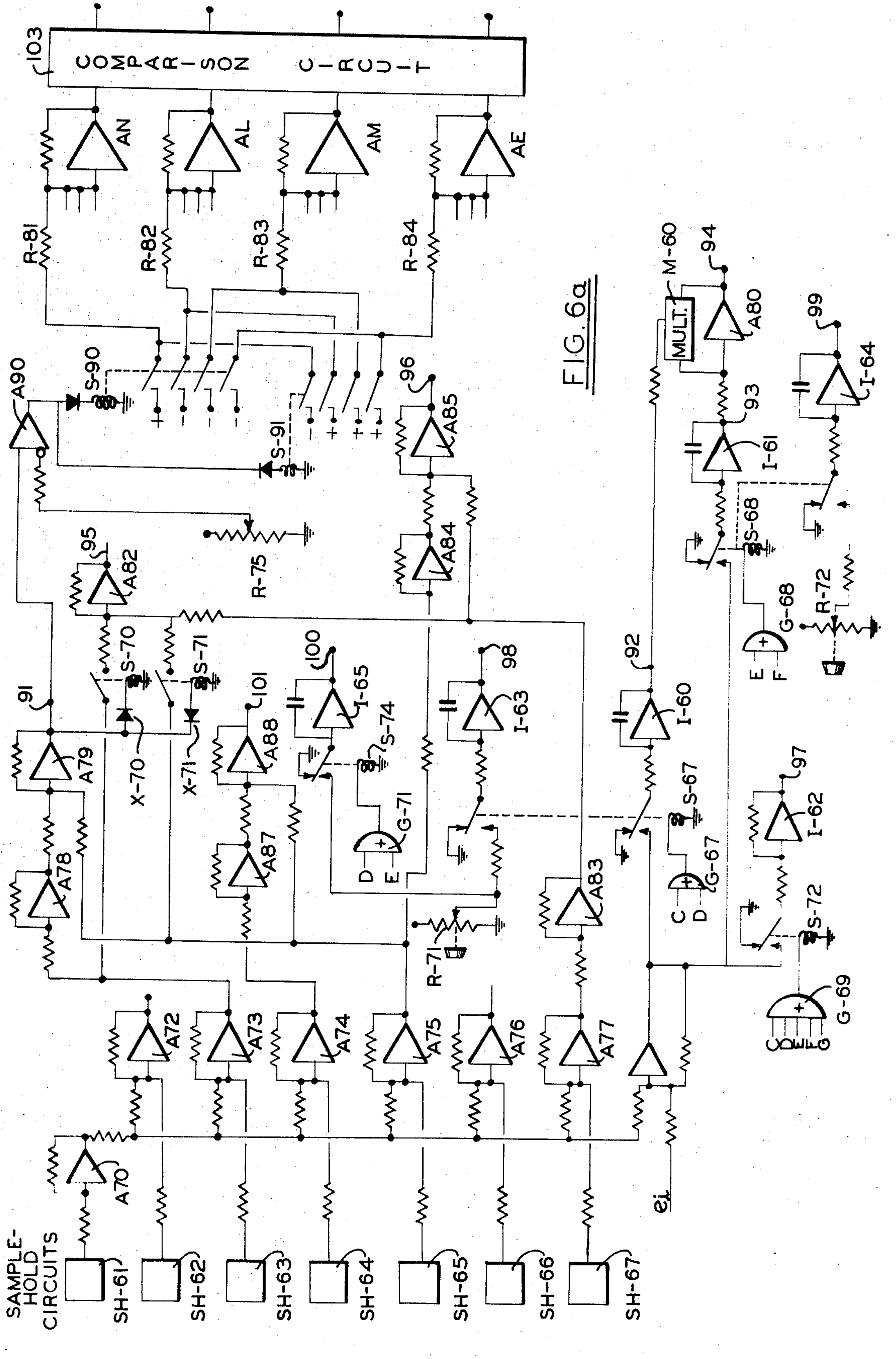

FIGS. 6 and 6*a* illustrate the principles of a further arrangement for identifying a histogram function in order to identify the type of leukocyte from which the histogram was derived. The histogram function may be applied through a smoothing network SN to the apparatus of FIGS. 6 and 6*a* in the same manner as it is shown applied to the oscilloscope in FIG. 5, although it need be applied only once, and then counter 62 may be arranged to halt. The smoothed output comprising the histogram function appears at $e_i$ in FIGS. 6 and 6*a*. The histogram input to FIG. 6 alternatively may be derived by applying the digital counts in counters C–0 to C–31 successively to a digital-to-analog converter, of course. The positive voltage histogram waveform is applied as one input to summing amplifier A61, together with a negative input from potentiometer R–60, which applies a voltage commensurate with a density value indicated at BL in FIG. 3. As the leading edge of the background peak 40 is encountered, the output voltage from amplifier A61 goes negative and applies a voltage through diode X–61 to set flip-flop FF–61. Ring counter CO–60 has a plurality of output lines lettered A through H, each of which is raised during a respective count condition, and the output lines connect to various gate circuits in FIGS. 6 and 6*a*, as indicated by corresponding letters adjacent the gate input lines. Counter C–60 initially is in a reference count condition with its A output line high, so setting of flip-flop FF–61 enables AND gate G–60, thereby closing electronic switch ES–60 to connect the histogram waveform to a maximum detecting circuit which includes amplifier A63 and capacitor C–60. So long as the histogram waveform increases positively, both inputs to amplifier A63 increase positively, with the input from diode X–62 lagging slightly behind that applied through resistor R–61 due to the time-constant of resistor R–62 and capacitor R–60, so that the output voltage of amplifier A63 is slightly negative. When the histogram input voltage $e_i$ reaches the top of background peak 40 and begins to decrease, the output voltage of amplifier A63 will go positive, pulsing monostable flip-flop MF–60. The output of mono-flip-flop MF-60 enables and gate G–62, temporarily closing switch ES–61 to store the background peak voltage level in sample-hold circuit SH–61. The fall of the output pulse from monostable flip-flop MF–60 also applies a pulse via or gate G–65 to advance counter CO–60 to its B condition, and applies a pulse to close switch ES–63 and discharge capacitor C–60. The advancement of counter CO–60 from its A condition to its B condition signifies the occurrence of the background peak.

Advancement of counter CO–60 to its B condition applies a signal via or gate G–63 and AND gate G–64 to close switch ES–64, thereby connecting the histogram input voltage $e_i$ to a minimum detecting circuit which includes amplifiers A64, and A66. Advancement of counter CO–60 to the B condition will be seen to remove the A input to gate G–61 and hence to open switch ES–60, so that the $e_i$ voltage will no longer be applied to the maximum detecting circuit.

A predetermined negative voltage greater than the background peak voltage is added to as an input to amplifier A64 through resistor R–64, making the resultant input to amplifier A64 negative, and the output of amplifier A64 positive. As the $e_i$ input decreases toward the trough separating peaks 40 and 41 in FIG. 3, the total input to A64 becomes increasingly negative, and the amplifier A64 output increasingly positive. So long as the histogram waveform $e_i$ decreases and the A64 amplifier output increases positively, both inputs to amplifier A66 will increase positively, with the input through diode X–64 lagging slightly behind the other input, due to the time-constant of resistor R–65 and capacitor C–61, so that the amplifier A66 output will be negative. As the $e_i$ voltage reaches a minimum between peaks 40 and 41 the output voltage of amplifier A66 will be seen to swing positive, thereby triggering monostable flip-flop MF–61. The rise of the MF–61 output raises line K and enables gate G–66 to close switch ES–65 and store the minimum value in sample-hold circuit SH–62. The fall of the MF–61 output then advances counter CO–60 to its C condition and temporarily closes switch ES–66 to discharge capacitor C–61. Advancement of counter CO–60 to its C condition will be seen to re-enable gate G–60 by way of gate G–61, thereby re-applying the $e_i$ input to the maximum detecting circuit. As the $e_i$ input varies between further maxima and minima, they are alternately detected by the maximum and minimum detecting circuits, and each maximum and minimum value of the waveform is stored in a respective sample-hold circuit. While FIG. 6 shows the use of seven sample-hold circuits for storing four maximum and three minimum values, it will be apparent that additional circuits may be added. When ring counter CO–60 reaches a last condition, H, it resets flip-flop FF–61, and controls various switches mentioned below in connection with FIG. 6*a*. The states of counter CO–60 as the various portions of the histogram of FIG. 3 are applied to the apparatus of FIG. 6 are shown across the top of FIG. 3.

FIG. 6*a* illustrates various techniques which may be utilized to process the output signals which are stored in the sample-hole circuits as a result of the application of the histogram waveform to the apparatus of FIG. 6. The background peak signal stored in sample-hold SH-61 is inverted by amplifier A 70 and combined separately with each of the other sample-holder circuit outputs in respective summing amplifiers (A72 through A77) to provide normalized outputs. If desired, each of the outputs from sample-hold circuits SH–62 through SH–67 can instead be normalized by applying it to a respective electronic multiplier which receives an input from the background peak circuit SH–61.

The normalized cytoplasmic peak density value output from amplifier A73 is inverted by amplifier A78 and summed by amplifier A79 with the normalized nuclear peak density output from amplifier A75 to provide an output voltage at terminal 91 representing nuclear-cytoplasmic contrast. When counter CO–60 (FIG. 6) is switched to its C state, and while it is in its C and D states, gate G–67 energizes relay S–67, connecting the histogram waveform, and an opposing potential commensurate with the background peak, to electronic integrator I–60, thereby charging up the integrator to provide an output voltage at terminal 92 commensurate with cytoplasmic integrated optical density. When counter CO–60 is switched to its E state, and while it remains in its E and F states, gate G–68 energizes relay S–68, thereby applying the histogram waveform and the opposing background peak potential to integrator I–61, thereby charging up the integrator to provide an output potential at terminal 92 commensurate with nuclear integrated optical density. The cytoplasmic and nuclear integrated optical density signals are applied to a divider circuit comprising electronic multiplier M–60 and amplifier A80 to provide a potential at terminal 94 commensurate with the ratio between the two integrated densities.

The polarity of the output from amplifier A79 will be seen to indicate which peak of the pair of nuclear and cytoplasmic peaks is higher. If the cytoplasmic peak is higher, diode X–70 closes relay S–70 to apply the cytoplasmic peak value from amplifier A73 to amplifier A82, and if the nuclear peak is higher, diode X–71 closes relay S–71 to apply the nuclear peak value from amplifier A75 to amplifier A82. The minimum frequency value representing dark portions stored in sample-hold SH–67, and normalized at amplifier A77 is also inverted by amplifier A83 and applied to amplifier A82, thereby providing an output signal at terminal 95 representing the deviation or difference between the highest peak and the lowest trough in the histogram. In similar fashion amplifiers A84 and A85 provide an output at terminal 96 representing the difference between the nuclear peak value and the lowest trough value.

When counter CO–60 is switched to its C condition at the trough following the background peak, and throughout the rest of the histogram, or gate G–69 energizes relay S–72 to apply the histogram waveform $e_i$ and the opposing normalizing voltage from SH–61 to integrator I–62, thereby providing a voltage at terminal 97 commensurate with the integrated optical density of the entire cell. While relay S–67 is energized, while the cytoplasmic portion of the histogram waveform occurs, a constant potential will be seen to be applied from potentiometer R–71 to integrator I–63, thereby providing an output at terminal 98 commensurate with the cytoplasmic area of the cell. While relay S–68 is energized, during the nuclear portion of the histogram waveform, a constant potential is applied from potentiometer R–72 to integrator I–64, thereby providing an output potential at terminal 99 commensurate with nuclear area of the cell. During the D and E conditions of counter CO–60 or gate G–71 energizes relay S–74 applying a constant potential from potentiometer R–71 to integrator I–65, thereby providing an output potential at terminal 100 commensurate with the horizontal separation between the nuclear and cytoplasmic peaks in FIG. 3.

It should be emphasized that a wide variety of other measurements may be made on the histogram function, and those shown in FIG. 6*a* are merely illustrative. The outputs of adjacent sample-hold circuits (e.g. SH–63 and SH–64) or from amplifiers A74 and A75, may be subtracted as indicated by amplifiers A87 and A88, to provide an output potential at terminal 101 which indicates the average slope of a portion of the histogram, for example, and slopes of different portions of the histogram may be compared with each other, of course. By utilizing the outputs of the various sample-hold circuits and those from terminals such as 91–101, logic circuitry may be operated so as to distinguish between various types of leukocytes. Nuclear-cytoplasmic contrast, for example, is important in distinguishing a neutrophil from a lymphocyte, a monocyte and an eosinophil, and hence a comparator circuit responsive to the voltage on terminal 91 may provide a logic signal indicating that the cell which was scanned is a neutrophil. Another comparator circuit responsive to the cytoplasmic integrated optical density voltage on terminal 92 may provide a logic signal indicating that the cell scanned tends to be an eosinophil. Various of the parameters of the histogram indicate that a leukocyte tends to be a unique one of the four mentioned types, while other parameters indicate that the scanned cell may be one of two or three of the four types, as indicated by the following table.

| Histogram Parameter | Separation |
|---|---|
| 1. nuclear-cytoplasmic contrast | N/L, M, E |
| 2. cytoplasmic integrated optical density E/L, M, N | |
| 3. mean optical density ratio, nucleus to cytoplasm | N/L, M, E |
| 4. nuclear area | M/L, N, E |
| 5. optical density peak for cell | N/L, M, E |
| 6. standard deviation of cell optical densities | N/L, M, E |
| 7. standard deviation of nuclear optical densities | N/L, M, E |
| 8. optical density peak for cytoplasm | N/L, M, E and M/E |
| 9. cell integrated optical density | L, N/M, E |
| 10. cell mean optical density | L, E/N |
| 11. frequency at nuclear optical density peak | M/N/L |
| 12. cytoplasmic mean optical density | E/N, M and L/N |
| 13. cytoplasmic area | L/E, N and M/E |

In the Table the letters E, L, M and N stand for eosinophil, lymphocyte, monocyte and neutrophil, respectively, and the slash lines indicate the type of separation which each histogram parameter is particularly useful in indicating. For example, N/L, M, E indicates that nuclear-cytoplasmic contrast is useful in distinguishing a neutrophil from a lymphocyte, a monocyte or an eosinophil.

Various of the histogram parameters represented by voltages in FIG. 6a may be applied to a plurality of comparators, to compare various of the parameters with predetermined threshold potentials to derive logic signals, and each logic signal may be used to provide a current to output circuits associated with each type of leukocyte which is to be identified. In FIG. 6a the nuclear-cytoplasmic contrast signal on terminal 91 is shown connected to comparator A90, which also receives a predetermined threshold potential as an input from potentiometer R–75. Over one range of contrast the amplifier A90 output will be positive, closing switch S–90 and thereby applying a positive voltage to amplifier AN and negative voltages to amplifiers AL, AM, and AE, while over a different range of contrast switch S–91 will apply a negative voltage to amplifier AN and positive voltages to amplifiers AL, AM, and AE. The voltages applied to amplifiers AN, AL, AM and AE may be applied as shown through weighting resistors typified by R–81 to R–84, with the conductivity of such resistors adjusted in accordance with the relevance or weight which a particular parameter has in determining whether the cell is a particular type of leukocyte. Many others of the histogram parameter values may be arranged to similarly apply either positive or negative voltages, (or no voltages where a parameter is not relevant) to various of the four output amplifiers, thereby providing a large positive voltage from the output amplifier associated with the type of leukocyte which was scanned, and lesser positive, or hopefully negative output voltages, from the other three amplifiers. The four amplifier output voltages then may be compared either with an absolute threshold potential, or with each other, or in both ways, to provide an output signal which identifies the leukocyte as being a particular one of the four mentioned types. The comparison circuit shown in block form at 103 may comprise four comparators similar to A90, each of which operates independently of the others, and may include ambiguity-detecting circuitry for providing an indication when the two largest of the four amplifier outputs do not differ sufficiently in magnitude, such as shown in Quade al al. U.S. Pat. No. 3,381,274, or alternatively may comprise a best match comparator of the type shown in Rabinow U.S. Pat. No. 2,933,246.

It will be readily apparent to those skilled in the art that the apparatus of FIGS. 6 and 6a may be modified so that the histogram values may be applied to the apparatus in reverse order, beginning with values representing darker or more dense portions of the pattern. The arrangement shown is preferred, however, because the extreme height of the background peak, and the great negative slope or rapid drop of the trailing edge of the histogram serve as reference values which simplify control of the waveform analyzing circuits.

Those skilled in the art will readily recognize that the operations shown performed by analog means in FIGS. 5, 6 and 6a all can be performed digitally, and that any general-purpose digital processor of common type may be utilized to provide equivalent identification of scanned patterns such as leukocytes.

While the invention has been described in connection with the identification of a specific class of patterns, i.e. leukocytes, it will be readily apparent to those skilled in the art as a result of this disclosure that the invention is applicable as well to the analysis or identification of a wide variety of other patterns, and in particular to complex patterns having a multiplicity of different shades of gray. In the identification of leukocytes in the specific manner described above, where identification is based solely on the histogram, the spatial arrangement of the elemental areas of the scanned pattern is wholly ignored. In various pattern analysis and identification applications it will be useful to base recognition on a combination of histogram values together with other scanning-derived signals indicative of spatial arrangement. Furthermore, while leukocyte analysis has been shown using the scanning of the entire leukocyte and some background area, some pattern analysis and identification applications will desirably utilize plural histograms derived from scanning different portions (which may partially overlap, if desired) of a pattern to be analyzed or identified.

These principles are embodied in the exemplary pattern recognition apparatus shown in FIG. 7 as constituting a paper currency detector. It will be readily apparent that in different applications the pattern could instead comprise an aerial photograph, or any one of a number of patterns having plural shades of gray. In FIG. 7 a flying spot scanner 110 is arranged to scan a first portion 111 of a document 113 to be identified to provide a first histogram from a signal processor 125, and then to scan a second portion 112 of document 113 to provide a second histogram from signal processor 125. The two histograms are registered or stored in two histogram storage devices 115 and 116. Control of scanner 110 to scan two different areas during the two successive rasters may be done simply by altering the bias on one of the deflection generators 110*v* or 110*h*. As in the previously-described embodiments, the histograms may be derived and stored in either digital or analog form. Using digital storage as shown in FIG. 2, one may either provide two sets of counters to register the values of the two histograms, or preferably, one may use the same single set of counters, and route the two sets of histogram values to two separate sections of the memory. Using analog storage as shown in connection with FIG. 4, one may provide two sets of analog integrators to store the values of the two histograms. One or both of the histograms then may be utilized together with other scanning-derived information to recognize the document. Identification may be based upon autocorrelation of one or both of the histograms, and/or upon cross-correlation of the two histograms, and/or upon cross-correlation of one or both of the histograms with other scanning-derived data or with stored data representing known documents. FIG. 7 assumes that the two histograms are stored in separate banks of analog integrators at 115 and 116, by closure of switch S–115 during the first raster and closure of switch S–116 during the second raster. Through each is shown as a single switch in FIG. 7, it will be understood that each of switches S–115 and S–116 comprises a bank of switches of the nature of switches T–O*a* to T–31*a* in the manner shown in FIG. 4, and that a corresponding plurality of lines extend from amplifiers A–0 to A–32 in processor 125 through the two banks of switches to banks of integrators in storage circuits 115 and 116. Application of two selected histogram values from integrators within bank 115 to comparator 118 represents elementary autocorrelation of the first histogram and similar inputs to comparator 119 represent elementary autocorrelation of the second histogram. Application of selected inputs from the two banks to comparators 120 and 121 represent elementary cross-correlation of the two histograms. Application of inputs from the two banks to comparators 122 and 123, to which predetermined voltages are also applied, represents elementary cross-correlation of the histograms with stored data values.

As well as providing an input to signal processor 125 to derive the histograms, the video signal from flying spot scanner 110 is applied to electronic switches 126*a* and 126*b*. The magnitudes of the horizontal and vertical sweep waveforms of the flying spot scanner are each detected, and gate signals close each switch once during each scanning raster, applying the video signal at two successive times to comparators 128 and 129. The vertical deflection waveform is shown applied to a first double-ended comparator circuit including differential amplifiers VA–70 and VA–71 which provide an output from and gate VG–70 when the vertical sweep waveform lies between two values determined by taps *a* and *b* on voltage divider RV–70, and a similar circuit provides an output from gate VG–71 when the vertical sweep waveform lies between two other values determined by taps *c* and *d*. A horizontal waveform detecting circuit similarly provides outputs at one or more selected ranges of the horizontal waveform, and hence and gates SG–70 and SG–71 will be seen to be enabled at several times during each of the two scanning rasters, while the flying spot scanner is scanning predetermined areas of the document. The output signals from gates SG–70 and SG–71 selectively connect the scanner video signal through switches 126*a* and 126*b* to comparators 128 and 129. If the video signal exceeds certain threshold values determined by the settings of potentiometers R–128 and R–129 during the successive instants, flip-flops FF–128 and FF–129 will be set. Unlike the histogram signal values, whether or not the flip-flops are set will be seen to depend upon the spatial arrangement of the dark and light areas on the document. Various combinations or all of the comparator and flip-flop outputs in FIG. 7 may be applied to a standard logic tree 137 to identify the document. If desired, a different photosensor also may be used to also view a portion of the document to provide a further logic input, as is typified by photocell 132, which is imaged by lens system 133 to view area 134 on the document through mask 135. The photocell 132 output also will be seen to depend upon the spatial arrangement of the dark and light areas on the document, and the logic signal derived by applying the photocell signal to comparator 138 also may be applied to logic tree 137 to provide a logic tree output identifying or classifying the document.

While the invention has been described with the assumption that monochromatic video scanner systems were being employed, and the term "shades of gray" has been used, it will be readily apparent to those skilled in the art that color-sensitive scanning systems may be used, with the tri-color output signals combined to provide a video waveform equivalent to a monochromatic waveform. However, where three video waveforms each representing a particular color are provided by the scanner, it will be seen that the three waveforms may be applied separately to three separate signal processors, so that scanning a given pattern provides data representing three separate histogram functions, and such data may be processed utilizing any of the techniques disclosed above in order to classify the scanned pattern.

While FIGS. 2 and 4 show systems which utilize either all digital integrating devices or all analog integrators, it will be apparent that a given machine may use a combination of both, with pulse counters arranged to record some density levels and analog integrators arranged to record other density levels. Whether analog or digital storage of histogram data values is used, it will be recognized that the rate at which the data values are read out is independent of the sweep repetition rates of the scanner. The scanner ordinarily will use conventional sweep repetition rates in the leukocyte identification system in order that the video signal remain suitable for driving a conventional television monitor without requiring a long-persistence screen, but in other pattern recognition applications where no monitor is necessary it will be apparent that much slower scanning systems may be employed, if desired. The speed at which the stored histogram data values are read out may be completely arbitrary, and may be selected so as to be compatible with the speed of the data storage or display devices to which the data values are applied.

It will thus be seen that the objects set forth above, among those made apparent from the preceding description, are efficiently attained, and since certain changes may be made in the above constructions and methods without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Pattern recognition apparatus for classifying a pattern comprised of elemental areas having three or more different light-remissive levels, comprising, in combination: means for optically scanning said elemental areas of said pattern in sequence to derive an electrical waveform having a parameter which varies in accordance with the light-remissive level of the elemental area being scanned at a given instant; signal processor means responsive to said electrical waveform for providing three or more groups of further signals, the signals of each group of said further signals being provided whenever said parameter of said electrical waveform lies between a respective pair of values defining a respective range of light remissive levels; accumulator means for separately accumulating the signals of each of said groups to provide three or more stored data signals, each individual one of said stored data signals representing the accumulation of the signals of a respective one of said groups and defining a respective value of a histogram function characteristic of said pattern; and analyzing means for processing said stored data signals to classify said pattern.

2. Apparatus according to claim 1 in which said light remissive property comprises the light transmissivity of said elemental areas.

3. Apparatus according to claim 1 in which said light remissive property comprises the reflectance of said elemental areas.

4. Apparatus according to claim 1 in which said parameter of said electrical waveform comprises the magnitude of said waveform.

5. Apparatus according to claim 1 in which said accumulator means includes an electronic pulse counter, and in which said apparatus includes a clock pulse generator, and switching means controlled by one group of said further signals for applying clock pulses from said clock pulse generator to advance said electronic pulse counter.

6. Apparatus according to claim 1 in which said accumulator means comprises an electronic analog integrating circuit operative to integrate an input signal with respect to time to provide an output voltage, and in which said apparatus includes switching means controlled by one of said groups of further signals for applying said input signal to said analog integrating circuit.

7. Apparatus according to claim 1 in which said means for scanning comprises optical scanning means operative to scan said pattern with a predetermined scanning pattern having a plurality of successive scan lines.

8. Apparatus according to claim 1 in which said accumulator means comprises a multiplicity of accumulator devices, each of said accumulator devices being connected to receive an input signal as a result of the occurrence of one of said further signals of a respective group, whereby the stored data signals provided by said multiplicity of accumulator devices define a multiplicity of points of said histogram function characteristic of said pattern.

9. Apparatus according to claim 1 in which said means for scanning is operative to scan said pattern with a multiplicity of successive scanning fields, each of said scanning fields comprising a plurality of scan lines, said signal-processor means being operative to provide each group of said further signals during a respective one of said successive scanning fields, whereby said accumulator means provides a succession of stored data signals at the completions of said successive scanning fields, and said succession of stored data signals define a multiplicity of points of said histogram function characteristic of said pattern.

10. Apparatus according to claim 1 in which said means for scanning is operative to scan a first group of said elemental areas of said pattern to derive a first electrical waveform and operative to scan a second group of said elemental areas of said pattern to derive a second electrical waveform, said first and second electrical waveforms being connected to said signal-processor means, and in which said accumulator means comprises first and second sets of accumulator devices, said first set of accumulator devices being connected to receive the said further signals provided by said signal-processor means in response to said first electrical waveform and said second set of accumulator devices being connected to receive the said further signals provided by said signal-processor means in response to said second electrical waveform, and logic circuit means responsive to the stored data signals provided by said first and second sets of accumulator devices for classifying said pattern.

11. Apparatus according to claim 1 in which said pattern comprises a leukocyte, and in which said means for scanning said pattern comprises optical means including a light microscope, said means for scanning being arranged to view said leukocyte through said microscope and to provide said electrical waveform as said leukocyte is scanned, and switching means synchronized with said scanning means for applying said electrical waveform to said signal processor means.

12. Apparatus according to claim 1 in which said accumulator means comprises a plurality of electronic analog integrating circuits each operative to provide an output voltage, and in which said apparatus includes function display means and switching means for sampling the output voltages from said integrating circuits and applying them in succession to said display means.

13. Apparatus according to claim 1 having further means for sensing the light remissive property at a predetermined location on said pattern to provide a further data signal, and means responsive to said stored data signals and said further data signal for classifying said pattern.

14. Apparatus according to claim 1 in which said signal-processor means comprises a group of amplifier circuits each connected to receive said electrical waveform as one input signal, and each connected to receive a respective bias potential as a second input signal, and each operable to provide an output signal having one or the other of two logic levels in accordance with the sign of the sum of the two input signals, and a group of gate circuits each having enable and inhibit input lines, the output signal from each of said amplifier circuits being connected to the enable input line of a respective one of said gate circuits and to the inhibit input line of a respective other one of said gate circuits.

15. Apparatus according to claim 1 in which said signal-processor means for providing said multiplicity of further signals comprises a plurality of comparator circuits each operable to provide a respective one of said further signals whenever said magnitude of said electrical waveform lies between a respective pair of electrical signal magnitudes defining a respective range of said light remissive property.

16. Apparatus according to claim 1 in which said means for scanning is operative to scan said pattern with a multiplicity of successive scanning fields, and in which said signal-processor means comprises a doubleended comparator circuit connected to receive said electrical waveform as one input signal and a pair of bias potentials defining a respective one of said ranges of light remissive property, and means for applying different pairs of said bias potentials to said comparator circuit during respective ones of said successive scanning fields, thereby to provide different groups of said further signals during respective ones of said successive scanning fields.

17. Apparatus according to claim 1 in which said analyzing means comprises means for comparing various of said stored data signals with each other to classify said pattern.

18. Apparatus according to claim 1 in which said analyzing means comprises means for comparing at least one of said stored data signals with a predetermined data value to classify said pattern.

19. Apparatus according to claim 1 in which said apparatus includes means for sampling said stored data signals to provide a time-varying waveform representative of said histogram function, and in which said analyzing means comprises waveform recognition apparatus responsive to said time-varying waveform.

20. Apparatus according to claim 5 having further means operative upon completion of the scanning of said pattern by said scanning means for connecting the count stored in said electronic pulse counter to digital storage means.

21. Apparatus according to claim 10 in which said logic circuit means includes means for comparing a stored data signal from an accumulator device of said first set with a predetermined data signal to classify said pattern.

22. Apparatus according to claim 10 in which said logic circuit means includes means for comparing a stored data signal from an accumulator device of said first set with a stored data signal from an accumulator device of said second set to classify said pattern.

23. Apparatus according to claim 11 having operator-control means for positioning said leukocyte relative to said microscope, and operator-visible television monitor means responsive to said electrical waveform for providing an image of said leukocyte.

24. Apparatus according to claim 11 having operator-controlled means for varying the magnification of said optical means.

25. Apparatus according to claim 11 in which said means for scanning said pattern includes deflection waveform generating means and unblanking circuit means for controlling said scanning means to provide a scanning raster, said apparatus including operator-controlled switching means; and timing means controlled by said deflection waveform generating means, said unblanking circuit means and said operator-controlled switching means for controlling said switching means synchronized with said scanning means.

26. Apparatus according to claim 12 in which said display means comprises curve plotter.

27. Apparatus according to claim 12 in which said display means comprises an oscilloscope.

28. Apparatus according to claim 12 in which said switching means includes filter means to provide a smoothly varying input voltage to said display means as the output voltages of integrating circuits are sampled in succession.

29. Apparatus according to claim 14 in which said accumulator means comprises a multiplicity of electronic pulse counters, said apparatus including pulse generator means for providing pulses at a predetermined repetition rate, said pulses being connected to a further enable input line of each of said gate circuits, whereby the enabling of one of said gate circuits applies pulses at said predetermined repetition rate to a respective one of said pulse counters.

30. Apparatus according to claim 17 in which said waveform recognition apparatus includes means for detecting a peak value of said time-varying waveform, and logic circuit means responsive to said detected peak value for classifying said pattern.

31. Apparatus according to claim 17 in which said waveform recognition apparatus includes means for detecting a minimum value of time-varying waveform, and logic circuit means responsive to said detected minimum value for classifying said pattern.

32. Apparatus according to claim 17 in which said waveform recognition apparatus includes means for detecting maximum and minimum values of portions of said time-varying waveform and logic circuit means for comparing said values with predetermined potentials to classify said pattern.

33. Apparatus according to claim 17 including means for detecting a plurality of characteristics of said time-varying waveform, and logic circuit means responsive to detection of said plurality of characteristics for classifying said pattern.

34. Apparatus according to claim 29 having computer memory means, and further gating circuit means operable upon the completion of the scanning of said pattern for storing the counts in said pulse counters at respective storage locations in said computer memory means.

35. In the method of classifying a pattern comprised of elemental areas having a multiplicity of different light remissive levels, the steps of scanning said elemental areas of said pattern in sequence to provide a signal having a parameter which varies in accordance with the light remissive property of the elemental area being scanned at any given instant; detecting three or more successive different levels of said signal representing different light remissive levels of successive of said elemental areas; separately totalizing the detections of said different signal levels to provide a plurality of data values each representing the frequency of occurrence of elemental areas having a respective one of said light remissive levels irrespective of the spatial location of said elemental areas within said pattern; and analyzing said data values after the completion of said scanning and the totalizing of said detections to classify said pattern.

36. The method according to claim 35 in which said step of analyzing said data values includes the step of comparing various of said data values with each other to classify said pattern.

37. The method according to claim 35 in which said step of analyzing said data values includes the step of comparing at least one of said data values with a predetermined data value to classify said pattern.

38. The method according to claim 35 wherein said step of analyzing said data values includes the step of determining the maximum value of a group of said data values.

39. The method according to claim 35 wherein said step of analyzing said data values includes the step of determining the minimum value of a group of said data values.

40. The method according to claim 35 wherein said step of analyzing said data values includes the step of determining the maximum value of a first group of said data values, the step of determining the maximum value of a second group of said data values, and the step of comparing the two maximum values.

41. The method according to claim 35 wherein said step of analyzing said data values includes the step of averaging a group of said data values.

42. The method according to claim 35 wherein said step of analyzing said data values includes the step of adding together a selected group of said data values.

43. The method according to claim 35 wherein said step of analyzing said data values includes the step of determining the difference between two of said data values.

44. The method according to claim 35 wherein said step of analyzing said data values includes the step of determining how many of said data values in a group of successive data values representing successive light remissive levels exceed a selected value.

45. In a method for classifying a biological sample comprised of elemental portions having three or more different optical densities, and arranged in a fixed geometrical relationship, the steps of: optically scanning a scanning field which encompasses said sample with a predetermined pattern of scan lines to derive a first plurality of signals having respective levels which vary in accordance with the light-remissive levels of said elemental portions; detecting within which range of three or more ranges of levels the level of each of said signals of said first plurality lies; and separately accumulating for each of said three or more ranges of levels those signals of said first plurality which lie within its respective range of levels to provide three or more further signals, each of said further signals being commensurate with the total area within said scanning field which lies within a respective range of light-remissive levels, whereby each of said further signals defines a respective value of a histogram function characteristic of said pattern.

46. Apparatus for classifying biological samples, comprising, in combination: means for optically scanning a field encompassing a biological sample fixed within said field during said scanning, along a plurality of scan lines, to derive an electrical waveform having a parameter which varies in accordance with the light remissive level of the elemental area of the field being scanned at a given instant; display means responsive to said electrical waveform and operative to provide an operator-viewable display of said sample within said field; signal-processor means responsive to at least a portion of said waveform for providing three or more groups of further signals, the signals of each group of said further signals being provided whenever said parameter of said electrical waveform lies between a respective pair of values defining a respective range of said light remissive property; and accumulator means for separately accumulating the signals of each of said groups to provide a multiplicity of stored data signals, each individual one of said stored data signals representing the totalization of the elemental areas lying within a respective range of said light-remissive property irrespective of the spatial location of said elemental areas within said field.

47. In apparatus for classifying a pattern comprised of elemental areas arranged in a fixed geometrical relationship within a scanning field, said elemental areas having three or more different light-remissive levels, the combination of scanning means including photosensor means for optically scanning said field and said elemental areas of said pattern with a predetermined scanning pattern covering said field and said elemental areas of said pattern to derive an electrical waveform having a parameter which varies in accordance with the light-remissive level of the elemental area being scanned at a given instant; signal processor means responsive to said electrical waveform for providing three or more groups of further signals, the signals of each group of said further signals being provided whenever said parameter of said electrical waveform lies between a respective pair of values defining a respective range of light-remissive levels; and accumulator means for separately accumulating the signals of each of said groups to provide three or more stored data signals, each of said stored data signals representing the total area within said scanning field which lies within a respective one of said ranges of light-remissive levels, whereby each of said stored data signals defines a respective value of a histogram function characteristic of said pattern.

* * * * *